(12) United States Patent
Liao et al.

(10) Patent No.: US 8,584,531 B2
(45) Date of Patent: Nov. 19, 2013

(54) ULTRASONIC GAS FLOW MEASUREMENT DEVICE INCLUDING A DUMBBELL-SHAPED FLOW TUBE TO INCREASE GAS FLOW SPEED

(75) Inventors: Shu-Ting Liao, Taipei (TW); Ya-Leei Chien, Taipei (TW); Shih-Jung Chang, Taipei (TW); Cheng-Hsing Kuo, Taipei (TW)

(73) Assignee: Tatung Company, Taipei (TW)

( * ) Notice: Subject to any disclaimer, the term of this patent is extended or adjusted under 35 U.S.C. 154(b) by 383 days.

(21) Appl. No.: 12/929,243

(22) Filed: Jan. 11, 2011

(65) Prior Publication Data

US 2012/0118074 A1 May 17, 2012

(30) Foreign Application Priority Data

Nov. 12, 2010 (TW) ............................... 99138995 A

(51) Int. Cl.
*G01F 1/66* (2006.01)
(52) U.S. Cl.
USPC ........................................................ 73/861.28
(58) Field of Classification Search
None
See application file for complete search history.

(56) References Cited

U.S. PATENT DOCUMENTS

| | | | | |
|---|---|---|---|---|
| 5,383,369 A | * | 1/1995 | Khuri-Yakub et al. | 73/861.29 |
| 5,440,937 A | * | 8/1995 | Lynnworth et al. | 73/861.29 |
| 5,811,689 A | * | 9/1998 | Collier et al. | 73/861.28 |
| 5,905,207 A | * | 5/1999 | Schalk | 73/861.28 |
| 6,539,812 B1 | * | 4/2003 | Bergamini | 73/861.29 |
| 6,606,916 B2 | * | 8/2003 | Bignell et al. | 73/861.27 |
| 7,082,841 B2 | * | 8/2006 | Umekage et al. | 73/861.27 |
| 7,360,448 B2 | * | 4/2008 | Maginnis et al. | 73/861.27 |
| 2007/0193367 A1 | * | 8/2007 | Umekage et al. | 73/861.27 |
| 2009/0288496 A1 | * | 11/2009 | Hiismaki et al. | 73/861.28 |

* cited by examiner

*Primary Examiner* — Harshad R Patel
(74) *Attorney, Agent, or Firm* — Bacon & Thomas, PLLC

(57) ABSTRACT

An ultrasonic gas flow measurement device includes a dumbbell-shaped tube, a first ultrasonic transceiver, a second ultrasonic transceiver, a first cover part, a second cover part and a control unit. The dumbbell-shaped tube includes a central tube part, a first cone part, a first tube part, a second cone part and a second tube part, wherein the first tube part has a flow inlet, the second tube part has a flow outlet, the central tube part connects to the first tube part through the first cone part, and connects to the second tube part through the second cone part. The first ultrasonic transceiver installed inside the first tube part is used for transmitting or receiving ultrasonic signals. The second ultrasonic transceiver installed inside the second tube part is used for transmitting or receiving ultrasonic signals. The control unit is used to control the first and second transceivers.

9 Claims, 3 Drawing Sheets

ULTRASONIC GAS FLOW MEASUREMENT DEVICE INCLUDING A DUMBBELL-SHAPED FLOW TUBE TO INCREASE GAS FLOW SPEED

BACKGROUND OF THE INVENTION

1. Field of the Invention

The present invention relates to a measurement device and, more particularly, to an ultrasonic gas flow measurement device.

2. Description of Related Art

The conventional ultrasonic measurement tube is provided to transmit an ultrasonic signal to the gas filled therein. Since a phase shift may be occurred when the ultrasonic signal passing through the gas, it is able to calculate the flow amount, the concentration and the molecular weight of the gas based on the phase shift between the transmitted and received ultrasonic signals. With reference to FIG. 1, FIG. 1 is a schematic diagram of a conventional ultrasonic measurement tube 1. As shown, the ultrasonic measurement tube 1 includes a transmitter 101, a receiver 102, a gas pipe 103 and a processing unit 104. The gas pipe 103 is a long straight cylindrical tube having an inlet 1031 and an outlet 1032. The transmitter 101 and the receiver 102 are disposed in two sides of the gas pipe 103 respectively. The processing unit 104 is connected to the transmitter 101 and the receiver 102 for controlling the transmitter 101 and the receiver 102, and calculating the phase shift between the transmitted and received ultrasonic signals.

When using the ultrasonic measurement tube 1 to measure a gas, the gas is first applied into the gas pipe 103 from the inlet 1031 for being filled in the gas pipe 103 and then flown out through the outlet 1032. The transmitter 101 transmits an ultrasonic signal in the gas pipe 103. The receiver 102 receives the ultrasonic signal and transfers it to the processing unit 104. The processing unit 104 calculates the phase shift between the ultrasonic signal transmitted by the transmitter 101 and the ultrasonic signal received by the receiver 102.

However, in general, the gas that users want to measure has small flow amount and slow flow speed. Thus, the flow amount and the molecular weight of the gas may be hard to distinguish when flowing into a long straight cylindrical tube as a conventional ultrasonic measurement tube. Furthermore, due to the slow flow speed, the transmitting distance has to be long enough to obtain a recognizable phase shift between ultrasonic signals, and thus the required length of the ultrasonic measurement tube is longer and its volume is accordingly larger. Besides, in the conventional ultrasonic measurement tube, the inlet and outlet of the gas pipe are disposed between the transmitter and the receiver, so that the ultrasonic signal may be influenced by the unstable disturbed flow, resulting in producing echo which is likely to affect the measurement results.

Therefore, it is desirable to provide an ultrasonic gas flow measurement device with a small volume to mitigate and/or obviate the aforementioned problems.

SUMMARY OF THE INVENTION

The object of the present invention is to provide an ultrasonic gas flow measurement device, which reduces gas channel by a dumbbell-shaped tube to increase the flow speed of the gas, so as to calculate its flow speed and molecular weight accurately.

To achieve the object, there is provided an ultrasonic gas flow measurement device, which comprises: a dumbbell-shaped tube including a central tube part, a first cone part, a first tube part, a second cone part and a second tube part, wherein the first tube part has a flow inlet for allowing a gas to flow into the dumbbell-shaped tube, the second tube part has a flow outlet for allowing the gas to flow out the dumbbell-shaped tube, and the central tube part connects to the first tube part through the first cone part and connects to the second tube part through the second cone part; a first ultrasonic transceiver disposed inside the first tube part for transmitting or receiving the ultrasonic signals, wherein at least one first flow channel is formed between the first ultrasonic transceiver and a tube wall of the first tube part; a second ultrasonic transceiver disposed inside the second tube part for transmitting or receiving the ultrasonic signals, wherein at least one second flow channel is formed between the second ultrasonic transceiver and a tube wall of the second tube part; a first cover part disposed outside the first tube part for preventing the gas from flowing out the dumbbell-shaped tube and for fixing the first ultrasonic transceiver inside the first tube part; a second cover part disposed outside the second tube part for preventing the gas from flowing out the dumbbell-shaped tube and for fixing the second ultrasonic transceiver inside the second tube part; and a control unit connected to the first and second ultrasonic transceivers for performing a control, so as to transmit and receive the ultrasonic signals to and from the central tube part.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
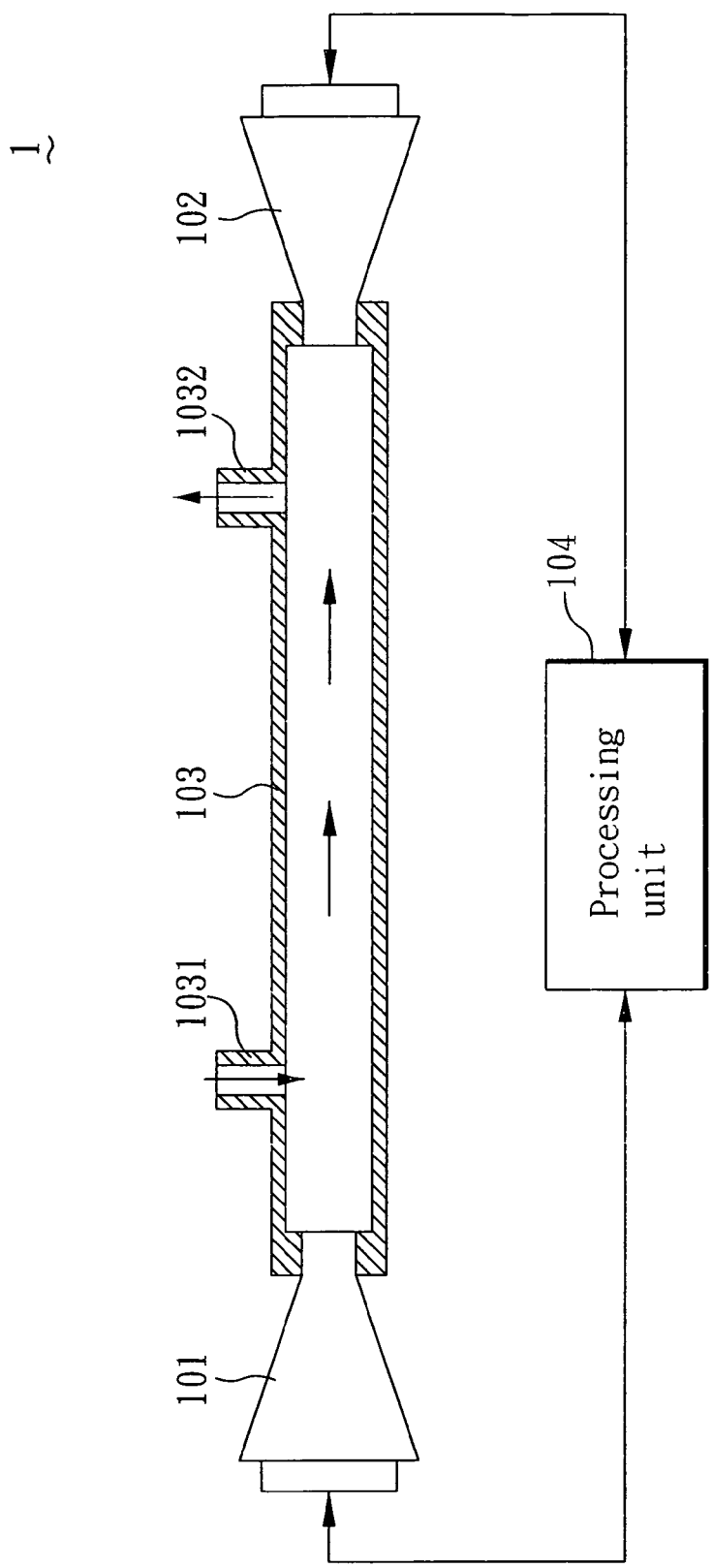
FIG. 1 is a schematic diagram of a conventional ultrasonic measurement tube.
Figure 2:
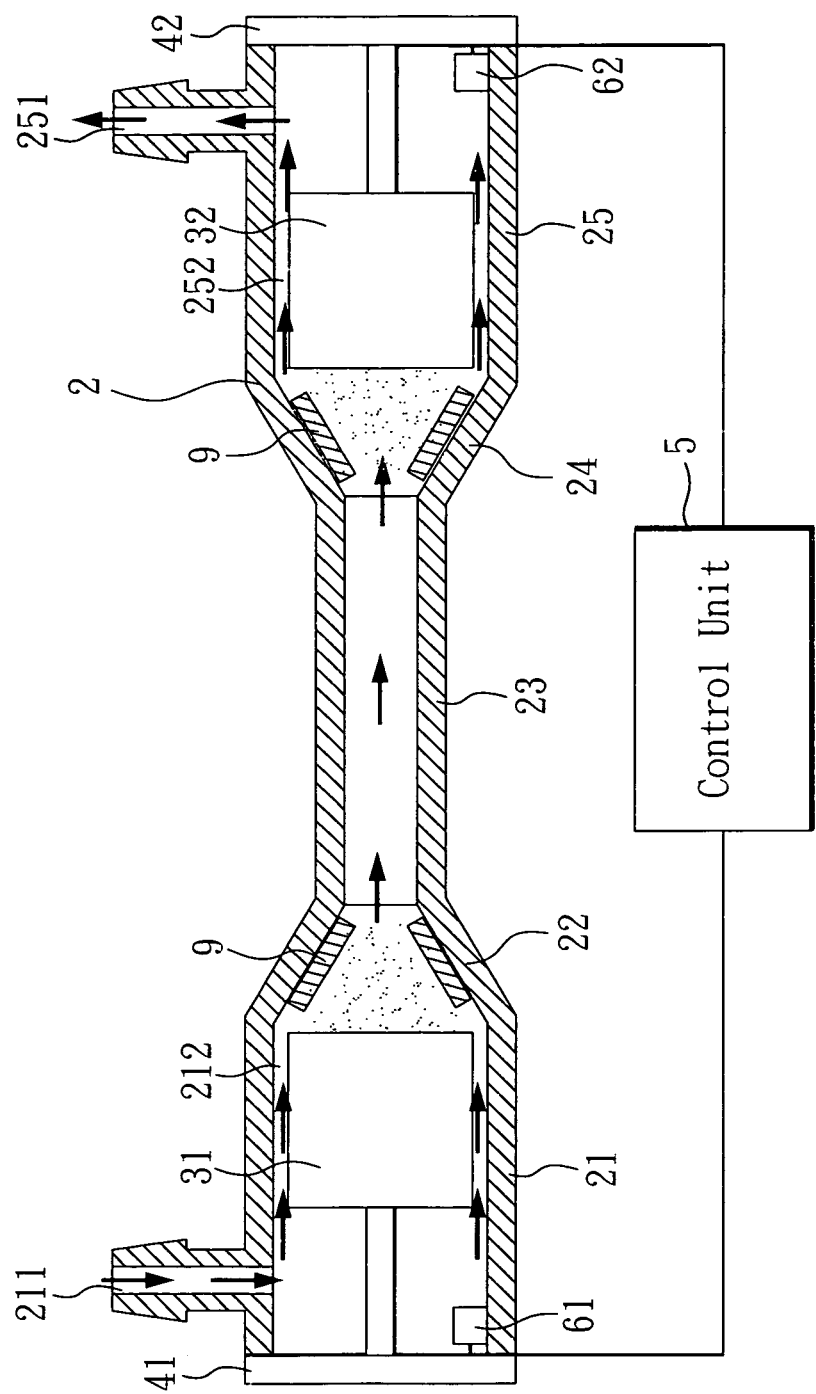
FIG. 2 is a schematic diagram of the ultrasonic gas flow measurement device according to the present invention.
Figure 3:
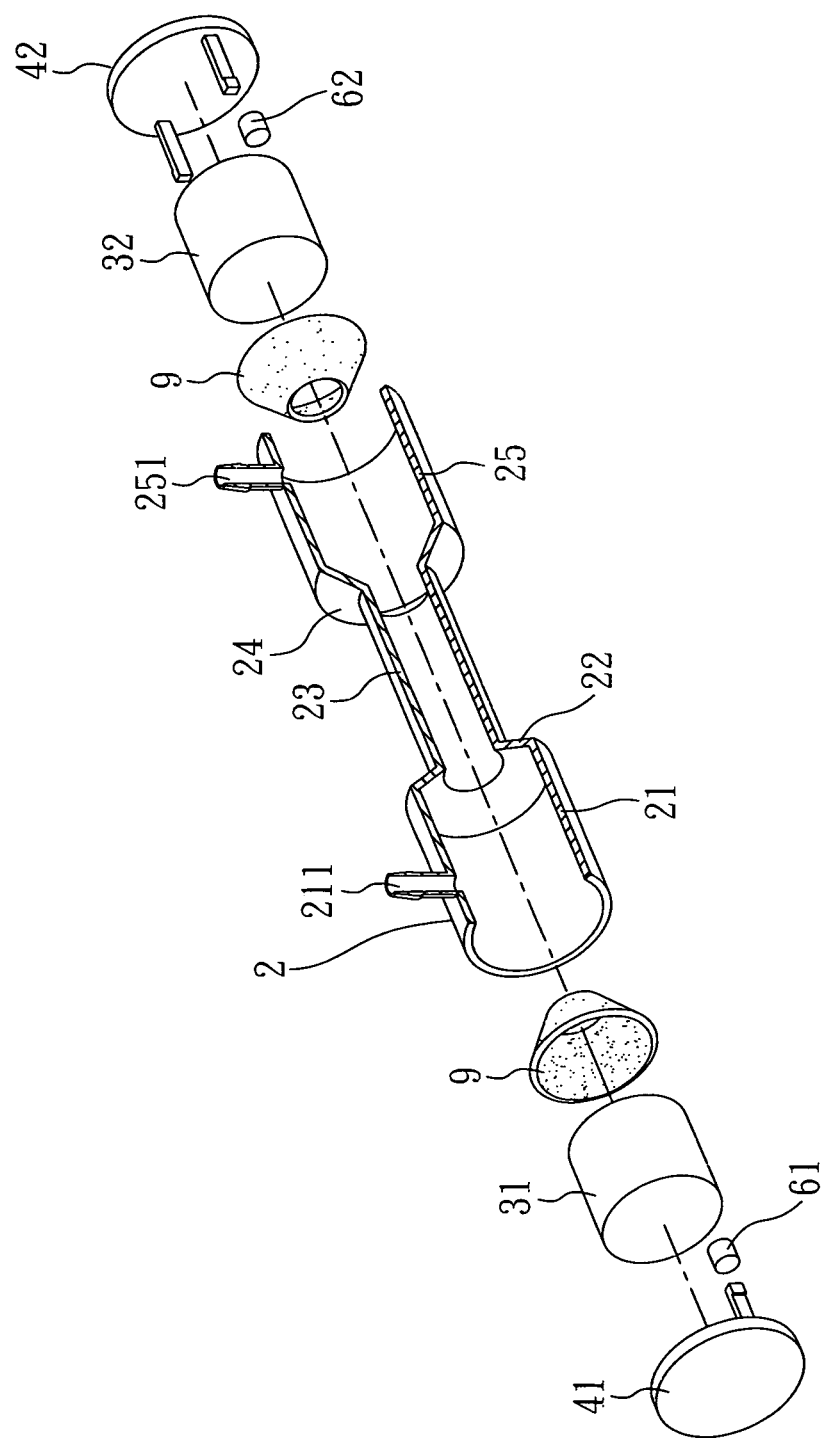
FIG. 3 is an exploded view of the ultrasonic gas flow measurement device according to the present invention.

With reference to FIGS. 2 and 3, FIG. 2 is a schematic diagram of the ultrasonic gas flow measurement device according to the present invention, and FIG. 3 is an exploded view of the ultrasonic gas flow measurement device according to the present invention. As shown, the ultrasonic gas flow measurement device includes a dumbbell-shaped tube 2, a first ultrasonic transceiver 31, a second ultrasonic transceiver 32, a first cover part 41, a second cover part 42, and a control unit 5.

The dumbbell-shaped tube 2 includes a first tube part 21, a first cone part 22, a central tube part 23, a second cone part 24 and a second tube part 25. The central tube part 23 connects to the first tube part 21 through the first cone part 22 and connects to the second tube part 25 through the second cone part 24. The first tube part 21 has a flow inlet 211 for allowing a gas to flow into the dumbbell-shaped tube 2. The second tube part 25 has a flow outlet 251 for allowing the gas to flow out the dumbbell-shaped tube 2. The first ultrasonic transceiver 31 is disposed inside the first tube part 21, and one or more first flow channels 212 are formed between the first ultrasonic transceiver 31 and the tube wall of the first tube part 21. The first ultrasonic transceiver 31 is used for transmitting or receiving the ultrasonic signals. The second ultrasonic transceiver 32 is disposed inside the second tube part 22, and one or more second flow channels 252 are formed between the second ultrasonic transceiver 32 and the tube wall of the second tube part 25. The second ultrasonic transceiver 32 is used for transmitting or receiving the ultrasonic signals. The first cover part 41 is installed outside the first tube part 21 for preventing the gas from flowing out the dumbbell-shaped tube 2, and fixing the first ultrasonic transceiver 31 inside the first tube part 21. The second cover part 42 is installed outside the second tube part 25 for preventing the gas from flowing out the dumbbell-shaped tube 2, and fixing the second ultrasonic transceiver 32 inside the second tube part 25. The control unit 5 is connected to the first ultrasonic transceiver 31 and the second ultrasonic transceiver 32 for controlling, so as to transmit and receive ultrasonic signals to and from the central tube part 23.

The ultrasonic gas flow measurement device further comprises a thermal sensor 61 and a pressure sensor 62. The thermal sensor 61 and the pressure sensor 62 are respectively disposed inside the first tube part 21 or the second tube part 22, and connected to the control unit 5. The thermal sensor 61 is used to sense the temperature and transmit the sensed temperature to the control unit 5 for performing correction during calculation. The pressure sensor 62 is used to sense the pressure and transmit the sensed pressure to the control unit 5 for performing correction during calculation.

When using the ultrasonic gas flow measurement device, the gas is first applied into the first tube part 21 from the inlet 211 for flowing into the central tube part 23 through the one or more first flow channels 212 and the first cone part 22, further flowing into the second tube part 25 through the second cone part 24 and the one or more second flow channels 252, and then flowing out from the outlet 251. Since the inner surfaces of the first cone part 22 and the second cone part 24 each have a slope, the gas may flow smoothly when passing the first cone part 22 and the second cone part 24, and in the same time, the ultrasonic signals may have fewer echo. Preferably, two silencer materials 9 may be covered on the inner surfaces of the first cone part 22 and the second cone part 24 for effectively preventing the ultrasonic signals from being influenced by its echo.

The control unit 5 controls the first ultrasonic transceiver 31 and the second ultrasonic transceiver 32, such that the first ultrasonic transceiver 31 transmits an ultrasonic signal and the second ultrasonic transceiver 32 receives the ultrasonic signal, or the second ultrasonic transceiver 32 transmits an ultrasonic signal and the first ultrasonic transceiver 31 receives the ultrasonic signal. The control unit 5 calculates the phase shift for the transmitted and received ultrasonic signals, so as to determine the concentration, the flow amount, and the molecular weight of the gas.

In practical applications, users could control the control unit 5 for controlling the first ultrasonic transceiver 31 to transmit a first ultrasonic signal and the second ultrasonic transceiver 32 receive the first ultrasonic signal, and then controlling the second ultrasonic transceiver 32 to transmit a second ultrasonic signal and the first ultrasonic transceiver to receive the second ultrasonic signal. According to the transmitted and received first and second ultrasonic signals, the control unit 5 may calculate the flow speed and the phase shift of the gas accurately, so as to determine the molecular weight of the gas.

In using the ultrasonic gas flow measurement device of the present invention for measurement, since the gas channels are reduced when the gas under test flows from the inlet 211 to the one or more first flow channels 212, the flow speed of the gas is increased. Thus, the required length of the central tube part 23 may be shorter than the conventional ultrasonic measurement tube to obtain a recognizable phase shift between ultrasonic signals. Namely, the required volume of the ultrasonic gas flow measurement device of the present invention is smaller than the conventional ultrasonic measurement tube, thereby efficiently achieving the effect of volume reduction.

Moreover, a dumbbell-shaped tube is used in the ultrasonic gas flow measurement device of the present invention. Since the first and second cone parts have slopes, fewer disturbed flows may be produced in comparison with the conventional ultrasonic measurement tube, and also, the echo of ultrasonic signals may be effectively reduced. In addition, the tube diameter of the first tube part and the second tube part are independent from the measurement of ultrasonic signals, and thus they may be designed flexibly according to the size of the ultrasonic transceivers.

Although the present invention has been explained in relation to its preferred embodiment, it is to be understood that many other possible modifications and variations can be made without departing from the scope of the invention as hereinafter claimed.

What is claimed is:

1. An ultrasonic gas flow measurement device, comprising:
   a dumbbell-shaped tube including a central tube part, a first cone part, a first tube part, a second cone part and a second tube part, wherein the first tube part has a flow inlet for allowing a gas to flow into the dumbbell-shaped tube, the second tube part has a flow outlet for allowing the gas to flow out the dumbbell-shaped tube, and the central tube part connects to the first tube part through the first cone part and connects to the second tube part through the second cone part;
   a first ultrasonic transceiver disposed inside the first tube part for transmitting or receiving the ultrasonic signals, wherein at least one first flow channel is formed between the first ultrasonic transceiver and a tube wall of the first tube part;
   a second ultrasonic transceiver disposed inside the second tube part for transmitting or receiving the ultrasonic signals, wherein at least one second flow channel is formed between the second ultrasonic transceiver and a tube wall of the second tube part;
   a first cover part disposed outside the first tube part for preventing the gas from flowing out the dumbbell-shaped tube and for fixing the first ultrasonic transceiver inside the first tube part;
   a second cover part disposed outside the second tube part for preventing the gas from flowing out the dumbbell-shaped tube and for fixing the second ultrasonic transceiver inside the second tube part;
   a control unit connected to the first and second ultrasonic transceivers for performing a control, so as to transmit and receive the ultrasonic signals to and from the central tube part; and
   two silencer materials covering on inner surfaces of the first and second cone parts for preventing the ultrasonic signals from being influenced by echo.

2. The measurement device as claimed in claim 1, wherein the gas flows into the first tube part from the inlet, into the central tube part through the at least one first flow channel and the first cone part, into the second tube part through the second cone part and the at least one second flow channel, and flows out from the outlet.

3. The measurement device as claimed in claim 1, wherein the control unit controls the first and second ultrasonic transceivers such that the first ultrasonic transceiver transmits an ultrasonic signal and the second ultrasonic transceiver receives the ultrasonic signal.

4. The measurement device as claimed in claim 1, wherein the control unit controls the first and second ultrasonic transceivers such that the second ultrasonic transceiver transmits an ultrasonic signal and the first ultrasonic transceiver receives the ultrasonic signal.

5. The measurement device as claimed in claim 1, wherein the control unit is provided for calculating a phase shift from the ultrasonic signals transmitted and received by the first and second ultrasonic transceivers.

6. The measurement device as claimed in claim 5, further comprising a thermal sensor disposed inside the first tube part or the second tube part and connected to the control unit, for sensing a temperature inside the first tube part or the second tube part and transmitting the sensed temperature to the control unit for correction during calculation.

7. The measurement device as claimed in claim 5, further comprising a pressure sensor disposed inside the first tube part or the second tube part and connected to the control unit, for sensing a pressure inside the first tube part or the second tube part and transmitting the sensed pressure to the control unit for correction during calculation.

8. The measurement device as claimed in claim 5, wherein the control unit controls the first ultrasonic transceiver to transmit an ultrasonic signal and the second ultrasonic transceiver to receive the ultrasonic signal, and the second ultrasonic transceiver to transmit an ultrasonic signal and the first ultrasonic transceiver to receive the ultrasonic signal; the control unit calculates a flow speed of the gas from the ultrasonic signal transmitted from the first ultrasonic transceiver, the ultrasonic signal received by the second ultrasonic transceiver, the ultrasonic signal transmitted from the second ultrasonic transceiver and the ultrasonic signal received by the first ultrasonic transceiver, thereby determining the phase shift.

9. The measurement device as claimed in claim 5, wherein the control unit is provided to calculate a concentration, a flow amount, and a molecular weight of the gas from the determined phase shift.

* * * * *